RECORDING AND REPRODUCTION OF INTELLIGENCE SIGNALS
Filed Aug. 14, 1958 2 Sheets-Sheet 1
FIG. I
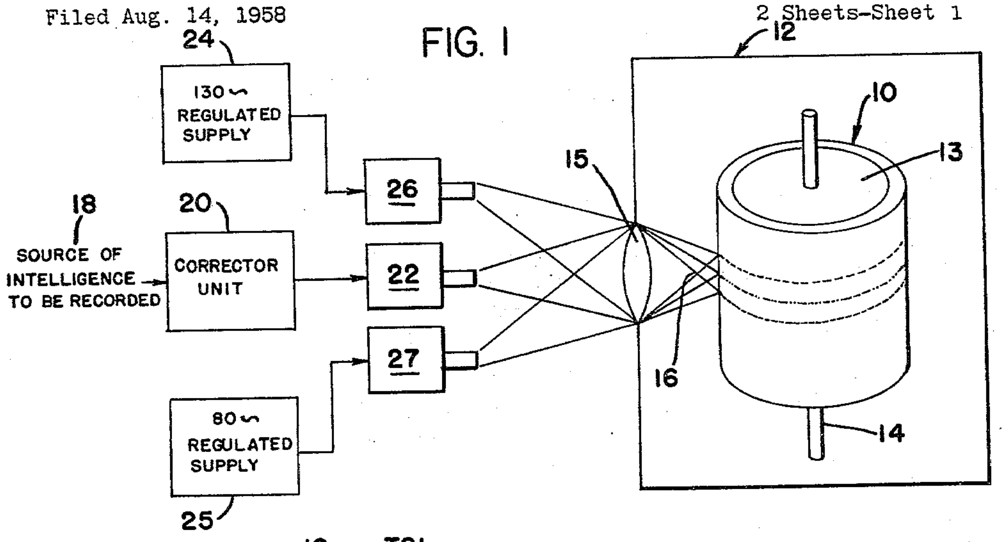
FIG. 2
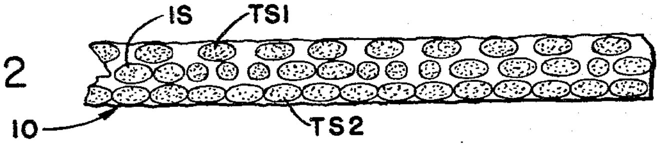
FIG. 3
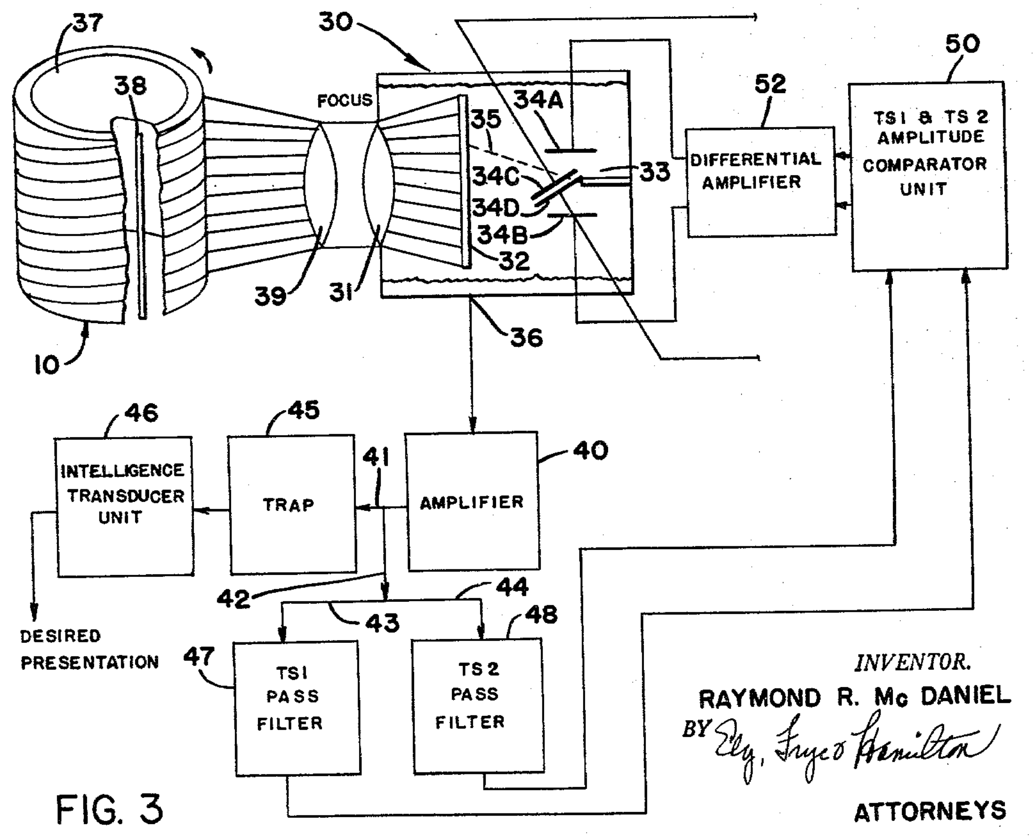
INVENTOR.
RAYMOND R. Mc DANIEL
BY Ely, Fryer & Hamilton
ATTORNEYS INVENTOR.
RAYMOND R. McDANIEL
BY Ely, Fryer & Hamilton
ATTORNEYS 3,187,114

RECORDING AND REPRODUCTION OF INTELLIGENCE SIGNALS

Raymond R. McDaniel, 852 Berwin St., Akron, Ohio

Filed Aug. 14, 1958, Ser. No. 755,104
3 Claims. (Cl. 179—100.3)

The present invention relates to the recording and reproduction of intelligence, information or data signals. More particularly, the invention relates to the use of a novel system permitting recording of large quantities of intelligence signals as a variable image on photosensitive material bounded by tracking images or sensory reading control signals which permit the recorded information signals to be readily reproduced.

It is an object of the present invention to provide an improved system for the conversion of intelligence, information or data signals, such as sound, the output of a computer or any occurrence of a detectable phenomenon expressible as an electrical signal, into a permanent record on a photosensitive material.

As is well known and conventional in the art, the electron beam generated by a cathode ray tube is caused to be deflected by an oscillator or generator. By applying the output of the generator to the deflection plates of the CRT, the generated oscillation may control the scanning character of the electron beam in a predetermined manner. For example, if the shape of the current curve of the generated cyclic output is that of a sawtooth type oscillation, the electron beam in its scanning movement goes from one end to the other upon a luminescent screen, during a predetermined scanning period, returning more rapidly to the initial starting point; the visual indication being a straight line upon the screen. Patent No. 2,485,829 may be referred to for a cathode ray tube which is conventionally affected by an oscillation generator.

Stored information to be read by the generated electron beam must be physically made to coincide with such an electron beam as it travels its predetermined path across its target, in order that the information be effectively read, as is necessary in the device of Patent No. 2,485,829. When reproducing information stored on photosensitive material, for example, the material must be mechanically positioned with respect to the beam target so as to accomplish the coincidence of the information and the electron beam. Since reading accuracy depends upon proper mechanical positioning of the material, there is actually no existing characteristic within the recorded information which inherently and automatically relates the instantaneous beam reading position to that position of the recorded information at any instant. Furthermore, the beam position as controlled by a signal generator in a conventional device is susceptible to voltage surges and static interference, for example, which limit the predictability of successive, instantaneous beam positions.

Accordingly, another object of the invention to avoid the above stated problem is to provide a cathode ray tube reading device whereby an instantaneous beam position is a function of the portion of recorded information being read as contrasted to the conventional beam positioning described by a cyclic deflection oscillator.

It is a related object to simultaneously record with the variable image of the intelligence signal a set of tracking or guide signal images so that a small area of photosensitive material will receive and store large quantities of intelligence.

A further related object is to simultaneously record the intelligence signal image with a set of tracking or sensory reading control signal images so that the stored information may be readily reproduced.

These and other objects of the invention, as well as the advantages over prior art systems, will be apparent in view of the following description and drawings.

In the drawings:

FIG. 1 is a block diagram of a system for recording intelligence, information or data signals on a cylinder of photosensitive material;

FIG. 2 is an enlarged representation of a portion of the photosensitive material of FIG. 1;

FIG. 3 is a block diagram of a system for reproducing intelligence signals recorded as in FIG. 1;

Figure 4:
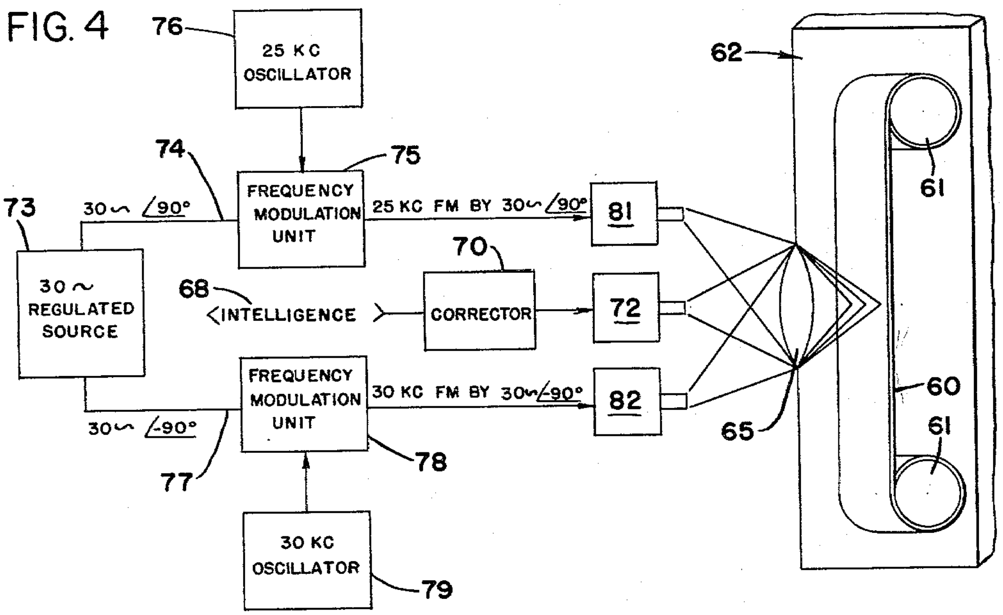
FIG. 4 is a block diagram of a modified form of the invention for recording intelligence, information or data signals with frequency modulated tracking images on a strip of photosensitive material.

In general, the concept of the invention calls for receiving the intelligence signal from its source and correcting or transforming the intelligence signal into a characteristic signal compatible with the system. The characteristic intelligence signal is then converted into a beam of modulated light which is finely focused to record the intelligence signal image on a moving cylinder or strip of photosensitive material. Simultaneously with recording the intelligence signal image, a pair of tracking or guide sensory reading control signal images are recorded on the photosensitive material. The separate and distinct tracking signal images are each derived from a regulated supply, are converted into beams of modulated light having a constant value and are focused one on either side of the intelligence signal image. After recording the intelligence and tracking signal images, the photosensitive material is developed in a conventional manner.

The reproduction portion of the system includes a camera tube having a lens, a light sensitive mosaic and an electron gun with a beam preferably scanning the mosaic in only one direction, transversely of the image bands on the photosensitive material. The cylinder or strip of photosensitive material is mounted to move past a flood source of light. The photographic images are focused by conventional adjustment means to converge through the camera tube lens and impinge upon a mosaic. As the electron beam begins to scan the mosaic, the signal output from the camera tube will correspond to the signal images impinged upon the mosaic. On passage from the camera tube, the combined signal images are separated or resolved. The reproduced intelligence signal image is transmitted to a transducer for conversion into a form for any desired presentation. The reproduced tracking image signals are filter passed to a comparator where the output is the difference of the tracking signal strengths. This difference signal may be differentially amplified and is applied to the deflection plates of the camera electron gun to direct the beam toward that point where the tracking signals will be of equal amplitude. When the tracking or sensory reading control signals are of equal amplitude, the electron beam will be directed at the intelligence signal image.

Referring to FIG. 1, this embodiment of the invention employs as the photosensitive material a cylinder or drum 10 of photographic film. The film of cylinder 10 is preferably graticular having an emulsion capable of resolving 8,000–15,000 lines per inch. These values are illustrative only, and the selection of an actual film composition for cylinder 10 is deemed within the competence of a person skilled in the art.

The film cylinder 10 is enclosed within the lightproof housing of a recording camera indicated at 12. The camera 12 has a cylindrical mandrel which slips within and carries the cylinder 10. The mandrel 13 is driven by suitable mechanical means (not shown) to rotate around and move longitudinally of the mandrel axis indicated at 14. The rate at which the mandrel 13 revolves around its axis primarily determines the fidelity of the intelligence signal image developed on a particular film. The rate at which the mandrel 13 moves longitudinally of its axis determines the spacing between image bands as established by the frequency of the images and the desired quantity of images per area of film, and the rate of axial movement of the mandrel is preferably preselected to provide sufficient longitudinal spacing of image bands to prevent scanning beam overlap or signal interference during subsequent reproduction operations as described below.

As an illustration, with a band spacing of $\frac{1}{64}$ of an inch, for a six-inch diameter cylinder of suitable length and composed of a graticular film capable of resolving 12,000 lines per inch, a proper surface speed of rotation for a characteristic intelligence signal corresponding of 6,000 cycle sound would be approximately $\frac{1}{2}$ inch per second. On the same basis, extreme fidelity for 10,000 cycle sound would require a surface speed of rotation at about one inch per second. These illustrations are exemplary only and the physical dimensions of the film cylinder and the rate of rotation and longitudinal movement thereof for recording of a particular intelligence signal are deemed within the competence of a person skilled in the art.

The camera 12 includes a converging lens 15. The focal point 16 of lens 15 is shown as between the lens and the surface of the film cylinder 10. However, the focal point 16 may be located as desired so long as the image bands impinge on the emulsion of film cylinder 10 as sharply defined parallel images.

The intelligence, information or data to be recorded appears as a signal from its source which is indicated at 18. The intelligence signal is preferably transmitted to a corrector unit 20 which may be one of several conventional electrical system components capable of transforming the intelligence signal to a signal compatible with the modulated light components 22 described below.

The corrector unit 20 may be an amplifier for a weak intelligence signal. Or, the intelligence signal could be expressed as a harmonic of one or more basic frequencies, suitably amplified or strengthened as desired. Alternatively, the corrector unit 20 could include switching circuits to selectively transmit the intelligence signals from a plurality of sources such as a battery of computers. Other applications of different type corrector units 20 will suggest themselves and so long as the output signal thereof is compatible with the system as a whole, the selection of any particular unit is deemed within the competence of a person skilled in the art.

It will further be understood that in certain applications, as when the intelligence signal has a pure frequency, the corrector unit 20 could be eliminated or bypassed and the intelligence signal fed directly to the modulated light component 22.

Component 22 expresses the intelligence signal received from the corrector unit 20 as a beam of modulated light which can be focused to project at the camera lens 15. Component 22 may be a device of the type described in Lee de Forest's Patent No. 2,735,049, issued February 14, 1956, reference being made thereto for a detailed disclosure.

Simultaneously with recording of the variable intelligence signal image on the film cylinder 10, there is recorded one on either side of the signal image band, tracking signal images having different and fixed frequencies. Components 24 and 25 are conventional regulated supply sources for the tracking frequencies. The output signal from each component 24 and 25 is transmitted to components 26 and 27, respectively. Components 26 and 27 are modulated beam devices of the same type as component 22.

The frequencies of the tracking signal from sources 24 and 25 must be different from each other and from the basic component of the intelligence signal. As an illustration, the frequencies could be 130 cycles per second from source 24 (TS2) and 80 cycles per second from source 25 (TS1). Or, it could be 150 cycles from source 24 and 90 cycles from source 25. The particular tracking frequencies used will be dictated largely by the availability of source components and so long as the frequencies differ from each other and from the basic component of the intelligence signal, the selection of tracking frequencies is deemed within the competence of a person skilled in the art.

The film cylinder 10, when developed to produce maximum resolution and graduation, will have a continuously spiraled three-track band, a portion of which is represented in FIG. 2. The amplitude of the intelligence signal (IS) image may vary as a function of light density. The upper and lower tracking or sensory reading control signal images will each have a constant density and change rate reflecting their respective amplitudes and different frequencies. The band image representations of FIG. 2 are intended to show a pulsating intelligence signal bounded by pulsating tracking signals at 80 cycles (TS1) and 130 cycles (TS2).

Referring to FIG. 3, this embodiment of the invention for reproducing the intelligence, information or data recorded on the film cylinder 10 includes a camera tube indicated at 30. The camera tube includes a lens 31, a light sensitive mosaic 32 and an electron gun 33, controlled by vertical deflection plates 34A and 34B, with electron beam 35 scanning the mosaic in only one direction. The signal output from the mosaic 32 appears at 36.

The film cylinder 10 is mounted on a transparent mandrel 37 which is continuously rotated by suitable mechanical means (not shown), preferably at the same rate as the recording mandrel 13 was rotated. Within the mandrel 37 is a flood source of light 38 suitably shuttered to project the band images of a continuously changing longitudinal segment of film cylinder 10 on an intermediate focusing lens 39. The band image at lens 39 passes through the camera lens 31 where it impinges on mosaic 32.

The electron beam 35 is suitable triggered to begin scanning adjacent the top of mosaic 32 and move transversely (at 90°) of each TS1, IS, TS2 band image. Beam triggering to begin scanning may be accomplished by any well-known means for initially and momentarily superpositioning a positive electrostatic voltage of deflection plate 34A; and this may be achieved by manual adjustment of the tube vertical deflection setting or by conventional automatic deflection voltage switching synchronized with the commencement of downward travel of the longitudinal segment of light source 38.

Suitable beam control circuitry and modes of operation for triggering beam scanning are disclosed, for example, in "Basic Electronics," Bureau of Naval Personnel (U.S. Government Printing Office, 1955), pp. 612–615 and "Modern Oscilloscopes and Their Uses," J. H. Ruiter, Jr. (Rinehart Books, Inc., N.Y., 1953), pp. 31–33. As the beam 35 impinges upon the mosaic 32, the signal output at 36 will vary in accordance with the degree and rate of change of lightness or darkness of the band images on the mosaic, the beam width being adjusted to the predetermined width of the band images by conventional beam focus or convergence setting means. The signal output at 36 is preferably amplified by conventional component 40 with the output appearing at 41, 42, 43 and 44.

Component 45 is a conventional trap for the tracking signals (TS1 and TS2) and permits only the intelligence signal (IS) to pass. The intelligence signal passes through component 45 and is transmitted to a transducer unit 46. The transducer unit 46 may be one of several conventional electrical system components capable of transforming the intelligence signal to the form required for the desired presentation.

The transducer unit 46 could be a speaker for sound presentation, an oscilloscope for visual presentation or an input component of a computer. Other applications of different type transducer units 46 will suggest themselves and the selection of any particular unit to present the intelligence signal is deemed within the competence of a person skilled in the art.

Components 47 and 48 are conventional band pass filters for the tracking or sensory reading control signals. Filter 47 is connected to lead 43 and if TS1 is 80 cycles, would permit only an 80 cycle signal to pass. Filter 48 is connected to lead 44 and if TS2 is 130 cycles, would permit only a 130 cycle signal to pass.

From the pass filter components 47 and 48, the separate tracking signals are simultaneously transmitted to a conventional amplitude comparator unit 50. The output signal of component 50 is the difference of the tracking signals strength. This difference signal is preferably transmitted through a conventional differential deflection amplifier 52 to control the voltages on vertical deflection camera plates 34A and 34B, with horizontal deflection plates 34C and 34D having a constant voltage impressed thereon for beam centering, if desired.

Assuming that the upper tracking signal image (TS1) is 80 cycles and the lower tracking signal image (TS2) is 130 cycles, when the electron beam 35 begins to scan the mosaic 32 as described above the 80 cycle signal will be strong and the 130 cycle signal will be weak. The several components following amplifier 40 will then react to control the voltages on plates 34A and 34B so that the electron beam 35 is deflected to the point where the tracking signals are of equal amplitude. When the tracking signals are of equal amplitude, the electron beam will be directed at an intelligence signal image on the mosaic 32. As the mandrel 37 rotates, the band image on the mosaic will change and the electron beam will be deflected to remain on the intelligence signal image, thus scanning the entire surface of the film cylinder 10 and reproducing all of the intelligence recorded thereon.

Referring to FIG. 4, this embodiment of the invention employs as the photosensitive material an elongated strip 60 of photographic film. The film of strip 60 has qualities the same as the film of cylinder 10. The film strip 60 is connected to suitable reels 61 driven by mechanical means (not shown) within a recording camera 62, similar to camera 12. The rate at which the film strip moves past a camera lens 65, similar to lens 15, determines the fidelity of the intelligence signal image developed on a particular film.

The intelligence, information or data to be recorded appears from source 68 and is preferably transmitted to a corrector unit 70, similar to unit 20. From unit 70, the intelligence signal is transmitted to a modulated light device 72, of the same type as component 22, which is focused to project at the camera lens 65.

The tracking or sensory reading control signals for this embodiment are derived from a conventional dual output regulated supply source 73. The signal appearing at 74 is transmitted to a conventional frequency modulation unit 75. The unit 75 also receives a signal from a conventional oscillator 76. The other signal from source 73 appearing at 77 is also transmitted to a conventional frequency modulation unit 78. The unit 78 also receives a signal from a conventional oscillator 79.

As shown, the source 73 generates 30 cycle current. The output at 73 may be a 30 cycle signal with a leading phase of 90°. The output signal at 77 may have a lagging phase of 90°. The oscillator 76 may supply a 25 kc. signal and oscillator 79 may supply a 30 kc. signal, to modulator units 75 and 78 respectively. These frequencies and phase angles are a matter of choice dictated largely by the availability of components and so long as the signals from the modulator units 75 and 78 differ from each other and from the basic component of the intelligence signal, their selection is deemed within the competence of a person skilled in the art.

The 25 kc. signal frequency modulated by 30 cycles at plus 90 degrees from unit 75, and the 30 kc. signal frequency modulated by 30 cycles at minus 90 degrees from unit 78, simultaneously transmitted to modulated beam devices 81 and 82 respectively, of the same type as components 22 or 72. The beams of modulated light are projected at camera lens 65 for simultaneous recording with the variable intelligence signal image on the moving film strip 60.

Figure 5:
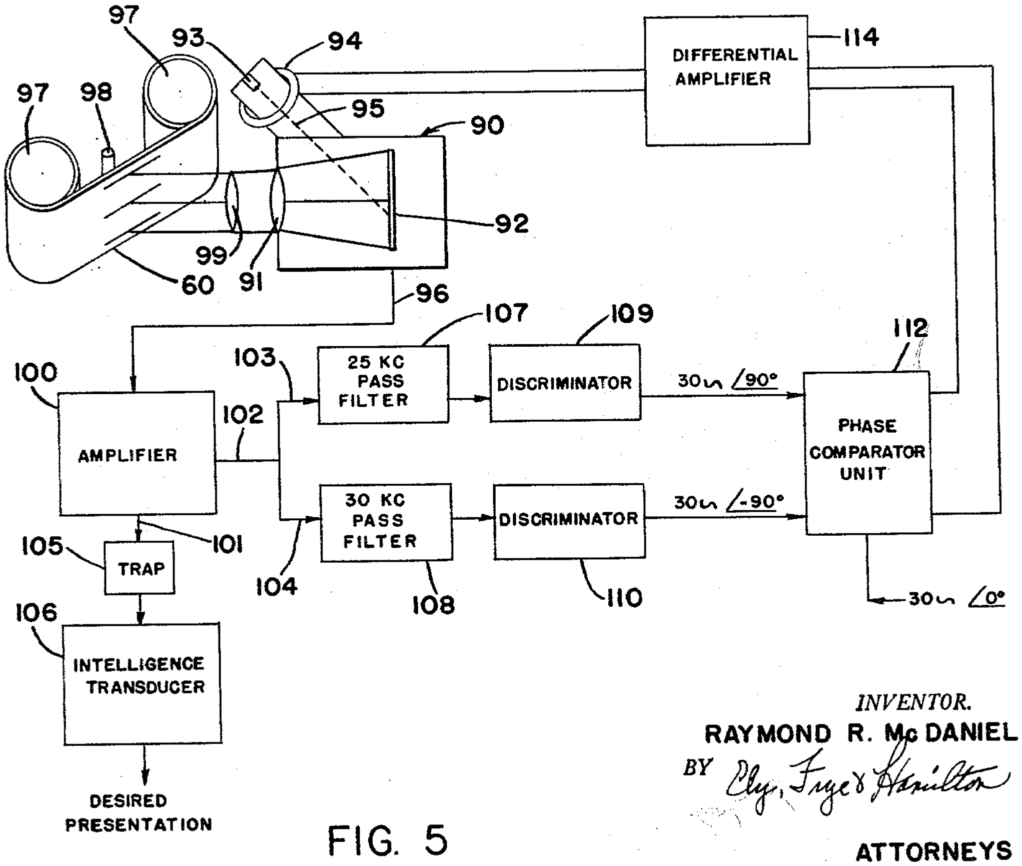
FIG. 5 is a block diagram of a system for reproducing intelligence signals recorded as in FIG. 4.

Referring to FIG. 5, this embodiment of the invention for reproducing the intelligence, information or data recorded on a developed film strip 60 includes a camera tube indicated at 90. The camera tube includes a lens 91, a light sensitive mosaic 92, an electron gun 93 and a deflection yoke 94 for the electron beam 95. The signal output from the mosaic 92 appears at 96.

The film strip 60 is connected to suitable reels 97 which are driven by suitable mechanical means (not shown), preferably at the same rate as the recording reels 61. Behind the film strip 60 is a flood source of light 98 suitably shuttered to project the band images of a continuously changing segment of the film strip on an intermediate lens 99. The band image at lens 99 passes through the camera lens 91 where it impinges on mosaic 92.

The electron beam 95 is suitably triggered to begin scanning from the top of mosaic 92 and move transversely across an image band. As the beam 95 impinges upon the mosaic 92, the signal output at 96 will vary in accordance with the degree and rate of change of lightness or darkness of the band images on the mosaic. The signal output at 96 is preferably amplified by conventional component 100 with the output appearing at 101, 102, 103 and 104.

Component 105 is a conventional trap for the tracking or sensory reading control signals and permits only the intelligence signal to pass to a transducer unit 106. The transducer unit 106 may be similar to unit 46 and presents the intelligence in a desired form.

Components 107 and 108 are conventional band pass filters for the tracking signals. Filter 107 is connected to lead 103 and permits only the 25 kc. signal frequency modulated by 30 cycles at plus 90 degrees to pass. Filter 108 connected to lead 104 permits only the 30 kc. signal frequency modulated by 30 cycles at minus 90 degrees to pass.

From the pass filters 107 and 108, the 25 kc. and 30 kc. signals are simultaneously transmitted to conventional discriminator components 109 and 110 respectively. The discriminator unit 109 passes only the 30 cycle at plus 90 degrees signal. The discriminator unit 110 passes only the 30 cycle at minus 90 degrees signal.

The output signals from units 109 and 110 are simultaneously transmitted to a conventional phase comparator unit 112. The output signal of the comparator unit is the difference of the tracking signals strength. This difference signal is preferably transmitted through a conventional differential deflection amplifier 114 to the control yoke 94 on the electron gun 93.

When one tracking or sensory reading control signal is stronger than the other, as when the electron beam has drifted away from the intelligence image on mosaic 92, the difference signal from the amplifier 114 will cause yoke 94 to deflect the electron beam until the output of the phase comparator unit 112 is zero. Thus, the electron beam 95 will be deflected to remain on the intelligence signal image while the film strip 60 is continuously moving.

The above disclosure presents various embodiments of the invention by way of explaining the concepts involved. However, the invention should not necessarily be limited by the specific components described and the scope thereof should be determined by the appended claims.

What is claimed is:

1. A system of the type described wherein an intelligence signal is recorded and reproduced upon photosensitive material, comprising, light valve means for projecting said intelligence signal as a modulated beam, regulated supply sources for originating tracking signals, additional light valve means for projecting said tracking signals as distinct modulated beams, means for movably mounting a portion of said photosensitive material, means to control impingement of all of said projected beams on said material portion so that said beams are simultaneously recorded as parallel images, a camera means having light sensitive mosaic and an electron gun with beams scanning said mosaic in only one direction, means projecting said parallel images on said mosaic, means following said mosaic to separate the signal therefrom into said intelligence signal and tracking signals, transducer means for presenting said intelligence signal, means for comparing the strength of said tracking signals, and means associated with said electron gun and activated by said comparing means controlling the deflection of said electron beam to a point where the tracking signals are of equal strength.

2. A system of the type described wherein an intelligence signal is recorded and reproduced upon photosensitive material, comprising, light valve means for projecting said intelligence signal as a modulated beam, regulated supply sources for originating constant tracking signals, additional light valve means for projecting said constant signals as distinct modulated beams, means for movably mounting a portion of said photosensitive material, means to control impingement of all of said projected beams on said material portion so that said beams are simultaneously recorded as parallel images, a camera means having light sensitive mosaic and an electron gun with beams scanning said mosaic in only one direction, means projecting said parallel images on said mosaic, means following said mosaic to separate the signal therefrom into said intelligence signal and constant signals, transducer means for presenting said intelligence signal, means for comparing the amplitude of said constant tracking signals and means associated with said electron gun and activated by said comparing means controlling the deflection of said electron beam to a point where the constant signals are of equal strength.

3. A precise positioning system for an energy beam comprising a plurality of parallel, equally-spaced control means interposed in the path of the beam, each of said control means operable to produce an electrical output pulse responsive to the impingement of the beam thereupon, means operatively connected to the output of said control means for transforming the output pulses of said control means into an analog output voltage, an analog amplitude comparator operatively connected to the output from said transforming means, adapted to receive an electrical input signal and operable to produce an error signal representative of their difference, deflection control means for the beam operatively connected to said comparator, said deflection control means initially operable to receive the input signal to move the beam and subsequently operable to reposition the beam in response to the error signal from said comparator, and a polarity comparator operatively connected to said amplitude comparator for determining the polarity of the error signal with reference to the preceding input signal.

References Cited by the Examiner

UNITED STATES PATENTS

| | | | |
|---|---|---|---|
| 1,623,756 | 4/27 | Sacia | 179—100.3 |
| 1,901,033 | 3/33 | Roberts | 179—100.3 |
| 1,909,370 | 5/33 | Mollina | 179—100.3 |
| 1,925,608 | 9/33 | Round | 179—100.3 |
| 2,000,198 | 5/35 | Smythe | 179—100.3 |
| 2,273,755 | 2/42 | Hardenberg | 179—100.3 |
| 2,292,014 | 8/42 | Roberts | 179—100.3 |
| 2,485,829 | 10/49 | Holst et al. | 179—100.3 |
| 2,769,028 | 10/56 | Webb | 179—100.3 |
| 2,855,540 | 10/58 | Hoover et al. | 315—21 |
| 2,937,239 | 5/60 | Garber et al. | 340—174.1 |

IRVING L. SRAGOW, *Primary Examiner.*

ROBERT H. ROSE, L. MILLER ANDRUS, NEWTON N. LOVEWELL, BERNARD KONICK, *Examiners.*

UNITED STATES PATENT OFFICE
CERTIFICATE OF CORRECTION

'atent No. 3,187,114

June 1, 1965

Raymond R. McDaniel

It is hereby certified that error appears in the above numbered patent requiring correction and that the said Letters Patent should read as corrected below.

Column 3, line 18, for "corresponding of" read -- corresponding to --; column 4, line 15, for "graduation" read -- gradation --; line 44, for "suitable" read -- suitably --; line 49, for "voltage of" read -- voltage on --; column 6, line 8, before "simultaneously" insert -- are --.

Signed and sealed this 26th day of October 1965.

(SEAL)
Attest:

ERNEST W. SWIDER
Attesting Officer

EDWARD J. BRENNER
Commissioner of Patents